Feb. 14, 1967 A. W. CHURCHILL 3,303,854
VALVE AND ACTUATOR THEREFOR
Filed Oct. 19, 1964 3 Sheets-Sheet 2

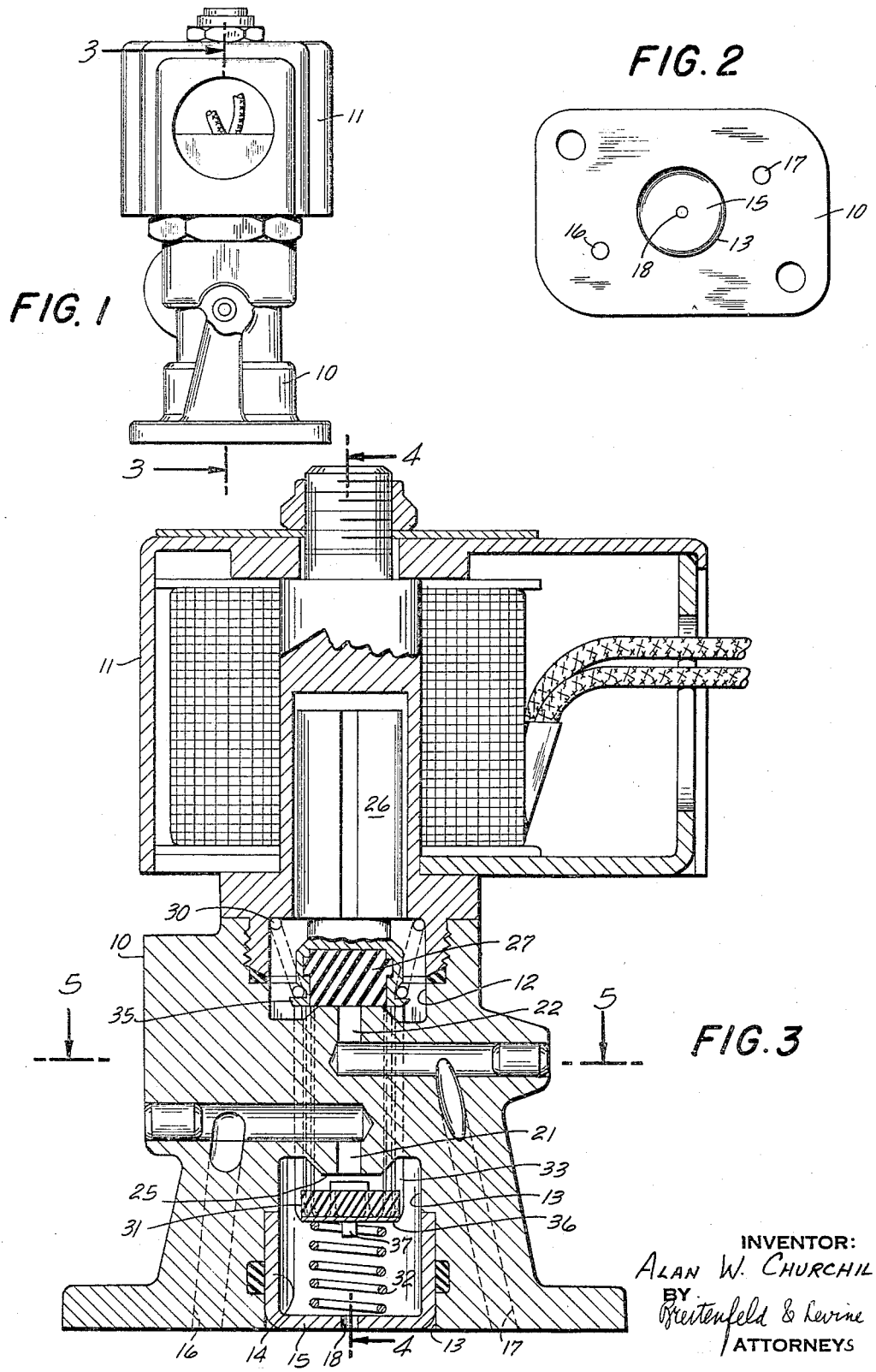

INVENTOR:
ALAN W. CHURCHILL
BY
Breitenfeld & Levine
ATTORNEYS

Feb. 14, 1967 A. W. CHURCHILL 3,303,854
VALVE AND ACTUATOR THEREFOR
Filed Oct. 19, 1964 3 Sheets-Sheet 3

INVENTOR:
ALAN W. CHURCHILL
BY
Breitenfeld & Levine
ATTORNEYS

United States Patent Office 3,303,854
Patented Feb. 14, 1967

3,303,854
VALVE AND ACTUATOR THEREFOR
Alan W. Churchill, Caldwell, N.J., assignor to Automatic Switch Company, Florham Park, N.J., a corporation of New York
Filed Oct. 19, 1964, Ser. No. 404,780
8 Claims. (Cl. 137—625.65)

This invention relates to solenoid valves and more particularly to valves wherein two orifices are alternatively closed and opened, i.e., one orifice being closed while the other is open and vice versa.

An example of such a valve is a three-way valve having three external ports, one of which may be brought into communication alternatively with the other two. In these valves, it is common practice to provide the valve body with a single chamber formed with a valve seat surrounding one of the orifices. An insert, independent of the valve body and formed with a valve seat surrounding an orifice, is located within the chamber with the two valve seats in opposed relation. A valve member is positioned within the chamber between the valve seats and is arranged to close one orifice and open the other or vice versa, in response to the operation of a solenoid. Means are provided to transmit the movement of the solenoid armature, located outside the chamber, to the valve member within the chamber.

It is an object of the present invention to provide a vavle of the type mentioned which is simpler than conventional valves, and much less costly to construct.

It is another object of the invention to provide such a valve wherein the valve body itself is provided with two valve seats, and no separate insert is required.

It is a further object of the invention to provide novel means for transmitting the motion of the solenoid armature to a valve member disposed at a location in the valve body remote from the solenoid.

It is still another object of the invention to provide a valve wherein the actuating elements for transmitting armature motion to a remote valve member do not pass through the valve orifices.

It is still a further object of the invention to provide a valve which is thoroughly practical from the points of view of fabrication and installation.

More specifically, this invention contemplates the employment of a valve body formed with two chambers and a valve seat surrounding an orifice in each chamber. The orifices lead into the chamber from the region of the valve body between the chambers, and the valve seats face in opposite directions. A valve member in one of the chambers is carried by the armature of the solenoid. Movement of the armature is transmitted to a second valve member in the other chamber by means of actuating elements slidable with respect to the valve body. The second valve member may be rigidly connected to the actuating elements so that the latter can serve to guide the movement of the valve member.

Other objects and advantages of the invention will be apparent from the following description in which reference is made to the accompanying drawings.

In the drawings:

FIG. 1 is a side elevational view of a three-way solenoid valve chosen to illustrate this invention;

FIG. 2 is a bottom plan view of the valve;

FIG. 3 is a vertical cross-sectional view taken on line 3—3 of FIG. 1;

Figure 4:
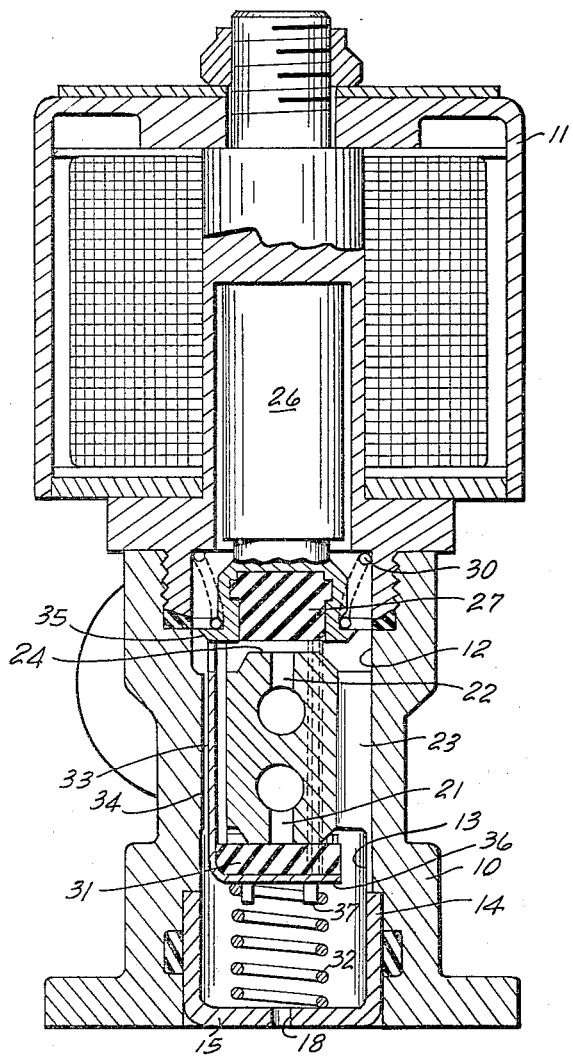
FIG. 4 is a vertical cross-sectional view taken on line 4—4 of FIG. 3.

The invention is illustrated in connection with a three-way valve comprising generally a valve body 10 and a solenoid 11 threadably mounted on the body. The body is provided at its upper end with a chamber 12, the upper portion of this chamber being formed by the hollow externally threaded end of the solenoid. The lower end of the body 10 is formed with another chamber 13 (see FIGS. 2–4). A cup 14 fitted snugly into an enlarged region of chamber 13 serves to close off the lower end of the chamber and provide it with a bottom wall 15. Suitable gaskets are provided between the valve body and the solenoid and between the valve body and the cup 14 to make the valve fluid tight.

The valve body is provided with two ports 16 and 17, and a third port 18 is formed in the bottom wall 15 of cup 14. For the sake of convenience, the port 17 will be referred to as the "pressure" port, the port 16 as the "exhaust" port, and the port 18 as the "cylinder" port. The exhaust port 16 communicates through suitable passageways within the valve body with an an orifice 21 which leads into the lower chamber 13 from the region of the body between the chambers 12 and 13. Similarly, the pressure port 17 communicates through suitable passageways with an orifice 22 leading into the upper chamber 12 from the region of the valve body between the chambers. (The terms "upper" and "lower" are used for the sake of convenience, and it is understood that the valve may be used in any desired orientation.) The two chambers 12 and 13 are in constant communication by virtue of a hole 23 (see FIGS. 4 and 5) extending between them, flow through this hole being unaffected by actuation of the valve.

An upwardly facing valve seat 24 within chamber 12 surrounds the orifice 22. A downwardly facing valve seat 25 within chamber 13 surrounds the orifice 21. Thus, the valve seat 24 communicates with the pressure port 17, and the seat 25 communicates with the exhaust port 16. The solenoid armature 26 extends into the chamber 12, and carries at its lower end within the chamber a valve member 27. When the solenoid is deenergized, a relatively heavy compression spring 30 within the chamber 12 urges the armature 26 into the position shown in FIG. 3 wherein the valve member 27 engages the upper valve seat 24. When the solenoid is energized, the armature 26 moves upwardly against the force of spring 30 to the position shown in FIG. 4 thus pulling the valve member 27 off the valve seat 24. Within the lower chamber 13 is a valve disk 31 movable into and out of engagement with the lower valve seat 25. A relatively light compression spring 32, extending between bottom wall 15 and the disk 31, urges the disk upwardly toward a seated position, as shown in FIG. 4.

Figure 5:
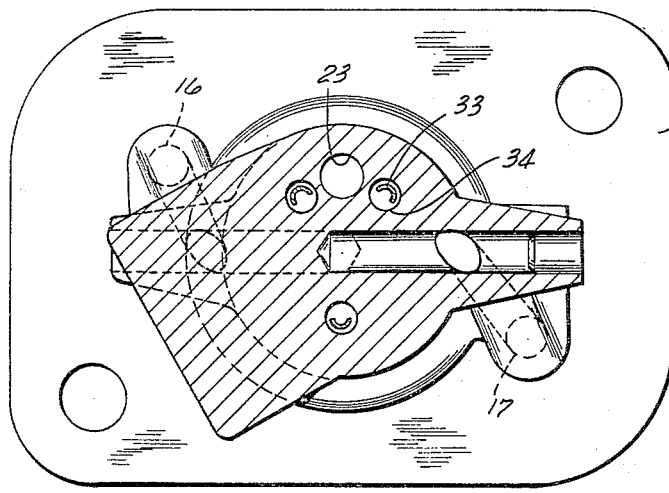
FIG. 5 is a horizontal cross-sectional view taken on line 5—5 of FIG. 3.

Located between the solenoid armature 26 and the valve disk 31 are three rigid actuating elements or pins 33 slidably accommodated within holes 34 in the valve body 10 (see FIGS. 3–5). The upper ends of the pins bear against a flange 35 presented by the lower end of the armature 26, and the lower ends of the pins terminate in a retainer 36 which holds the disk 31 against movement with respect to the pins 33. The pins 33 and retainer 36 will be more fully described below with reference to FIGS. 6–8. Depending from the retainer 36 are several lugs 37 which serve to position the upper end of the spring 32 with respect to the valve disk 31. It will be appreciated that the pins 33 serve to transmit the force of the spring 30 to the valve disk 31, and hence the spring 30 tends to move the valve disk 31 downwardly, against the force of spring 32, to the position shown in FIG. 3.

It may be seen from FIGS. 3–5 that the actuating elements 33 do not interset any fluid passageway in the valve body and do not extend through either of the orifices 21 and 22, as is true in some conventional valves. Instead, the pins slide through holes 34 spaced from and around the orifices. This is a great advantage, since in valves wherein the actuating element between solenoid armature and valve element passes through an orifice, the diameter of the orifice must be large enough to provide the desired flow area after subtracting the area occupied by the actuating element. As a result of the larger orifice area, the force required to actuate the valve member is greater, and therefore a larger solenoid must be provided.

Figure 6:
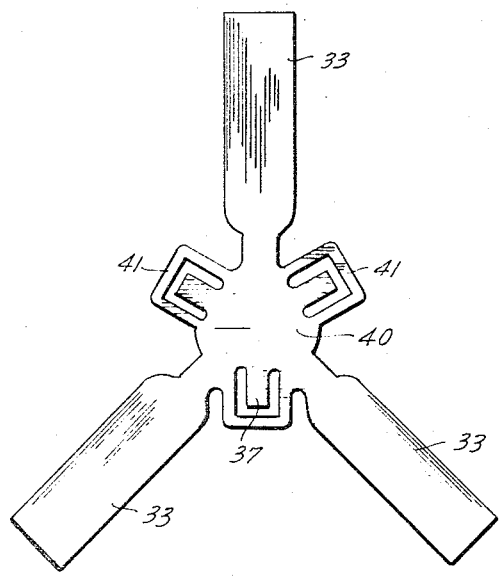
FIG. 6 is a pattern view of one form of actuating means according to this invention.
Figure 7:
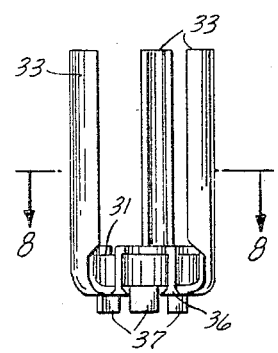
FIG. 7 is an elevational view of the actuating means and valve element.
Figure 8:
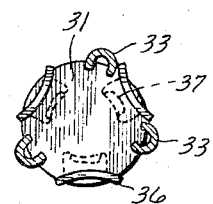
FIG. 8 is a horizontal cross-sectional view taken on line 8—8 of FIG. 7.

The pins 33 and retainer 36 are illustrated in detail in FIGS. 6–8. The stamped metal blank from which these elements may be formed is shown in FIG. 6. The flat blank includes a central wall 40 from which the three actuating elements 33 extend radially. Also extending radially from the central wall 40 are the lugs 37, one lug being present between each pair of elements 33, and U-shaped gripping members 41, one gripping member surrounding each lug 37. It is believed that the manner in which the blank of FIG. 6 is transformed into the unit of FIGS. 7 and 8 will be obvious. The valve disk 31 is placed on the central wall 40, and the gripper elements 41 are bent upwardly. The wall 40 and gripper elements 41, together form the valve disk retainer 36. The elements 33 are each bent upwardly to a vertical position, and each is bent along its longitudinal axis to provide it with a U-shaped cross-section for strength. The lugs 37 are bent downwardly to a vertical position to define the seat for the upper end of spring 32.

Figure 9:
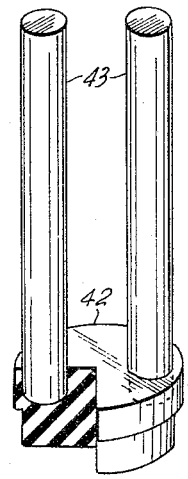
FIG. 9 is a perspective view of an alternative form of actuating means.
Figure 10:
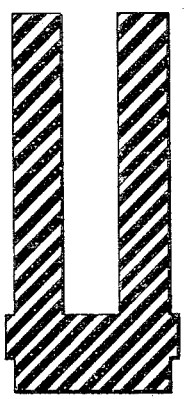
FIG. 10 is a perspective view of another alternative form of actuating means.

An alternative way of associating the lower valve disk with the actuating elements which transmit the armature motion to it is illustrated in FIG. 9. The vave disk 42 is formed of moldable material, such as rubber or a suitable plastic, and the lower ends of actuating elements or pins 43 are molded into the upper portion of the disk. In FIG. 9 only two pins 43 are shown, whereas three pins 33 are shown in the other figures. It is to be understood that the specific number of actuating elements employed is not important as long as they are capable of performing the intended function. Instead of molding the pins 43 into the disk 42, in some cases it may be advantageous to mold the disk independently, and provide in its upper surface, either by means of molding or by machining after the disk is molded, holes sized to snugly accommodate the pins 43 which are inserted into them. Still another alternative illustrated in FIG. 10, is the formation of a valve disk and pins as an integral molded unit of suitable material, such as nylon. In other words, the valve disk 42 and pins 43 can be formed integrally in a single molding operation. Under certain circumstances, it may be desirable to leave the actuating pins and lower disk unattached to each other. The lower ends of the pins can be arranged to bear against the upper face of the lower valve disk or holder for the disk. Separate means of any well-known type would then be provided for restraining lateral movement of the lower disk.

When the solenoid 12 is deenergized, as shown in FIG. 3, the spring 30 serves to press valve member 27 against valve seat 25, and the spring 30 also serves, through flange 35, pins 33, and retainer 36 to hold valve disk 31 off valve seat 25 against the force of the spring 32. Consequently, the exhaust port 16 communicates, through orifice 21 and chamber 13, with the cylinder port 18, and the equipment being controlled by the vave will be exhausted. When the solenoid is energized, the armature 26 moves upwardly compressing spring 30. As a result, the lighter spring 32 is permitted to move the valve disk upwardly against the valve seat 25. Furthermore, through pins 33, the spring 32 moves the valve member upwardly off seat 24. As a result, the pressure port now communicates, through orifice 22, chamber 12, hole 23, and chamber 13, with cylinder port 18. The equipment being controlled is thus pressurized. As just described, the three-way valve acts as a normally closed valve. If it is desired to operate it as a normally open valve, the port 16 is made the pressure port, and the port 17 the exhaust port.

The invention has been shown and described in one illustrative form, and obviously many changes may be made in this embodiment without departing from the spirit and scope of the invention. For example, although the valve shown is a manifold type, wherein all the ports are located at the bottom of the valve body, the invention is applicable to other types of valves, such as those in which the ports are threaded so as to be connectable to pipes having threaded ends. It is understood, therefore, that the invention is not limited to any specific form or embodiment except insofar as such limitations appear in the appended claims.

What is claimed is:

1. A solenoid valve having a one-piece valve body formed with two chambers in constant communication, an orifice leading into each chamber from the region of the body between the chambers, a port communicating with each of said orifices, a third port communicating with one of said chambers, a valve seat in each chamber surrounding said orifice, said valve seats facing in opposite directions, a valve member in each chamber movable into and out of engagement with said seat, a solenoid having an armature, one of said valve members forming part of said armature, and actuating means located outside the confines of said orifices and extending between said armature and the other of said valve members for transmitting the movement of the former to the latter.

2. A solenoid valve as defined in claim 1 wherein said actuating means are pins, said valve has holes slidably accommodating said pins, said holes constraining said pins to move along paths parallel to said orifices, and said other valve member is a disk rigidly connected to said pins, whereby said pins serve not only to transmit motion to said disk but also to guide the movement of said disk.

3. A solenoid valve as defined in claim 2 wherein said pins terminate at their lower ends in a retainer which tightly accommodates said disk and prevents relative movement between said disk and pins.

4. A solenoid valve as defined in claim 3 wherein said pins and retainer are integrally formed.

5. A solenoid valve as defined in claim 2 wherein said disk is formed of moldable material, and the lower ends of said pins are molded into said disk.

6. A solenoid valve as defined in claim 2 wherein said disk is provided with holes in its upper surface, and the lower ends of said pins are snugly accommodated within said holes.

7. A solenoid valve as defined in claim 2 wherein said disk and pins constitute an integrally formed molded unit.

8. A three-way solenoid valve comprising a one-piece valve body formed with chambers at its upper and lower ends, two ports in said valve body communicating with two orifices opening into said chambers, respectively, a third port communicating with one of said chambers, a hole in said valve body extending between said chambers for maintaining said chambers in constant communication, an upwardly facing valve seat in said upper chamber and a downwardly facing valve seat in said lower chamber surrounding said orifices, a valve member in said lower chamber movable into and out of engagement with said lower valve seat, a solenoid having an armature mounted at the upper end of said valve body, said armature extending into said upper chamber, a valve member within said upper chamber carried at the lower end of said armature, and rigid means between said armature and the valve member in said lower chamber for transmitting the movement of the former to the latter, said rigid means being slidable with respect to said valve body along a path outside of said orifices.

References Cited by the Examiner

UNITED STATES PATENTS

| | | | |
|---|---|---|---|
| 502,563 | 8/1893 | Hill | 137—625.27 |
| 2,515,029 | 7/1950 | Almond et al. | 137—625.65 |
| 2,587,357 | 2/1952 | McPherson | 137—625.64 |
| 3,096,790 | 7/1963 | Chatham et al. | 137—599.1 X |

FOREIGN PATENTS 251,044 11/1962 Australia.

M. CARY NELSON, *Primary Examiner.*

H. KLINKSIEK, *Assistant Examiner.*